(12) United States Patent
Bunker et al.

(10) Patent No.: US 8,364,623 B1
(45) Date of Patent: Jan. 29, 2013

(54) COMPUTER SYSTEMS MANAGEMENT USING MIND MAP TECHNIQUES

(75) Inventors: Guy Barry Owen Bunker, Buckinghamshire (GB); Christopher James Elphinstone Chandler, Boston, MA (US)

(73) Assignee: Symantec Operating Corporation, Mountain View, CA (US)

( * ) Notice: Subject to any disclaimer, the term of this patent is extended or adjusted under 35 U.S.C. 154(b) by 1979 days.

(21) Appl. No.: 11/190,609

(22) Filed: Jul. 27, 2005

Related U.S. Application Data

(60) Provisional application No. 60/695,041, filed on Jun. 29, 2005.

(51) Int. Cl.
*G06F 17/30* (2006.01)
*G06F 17/00* (2006.01)

(52) U.S. Cl. ......... 706/47; 707/792; 707/795; 707/796; 707/802; 707/794; 706/23; 706/4

(58) Field of Classification Search .................. None
See application file for complete search history.

(56) References Cited

U.S. PATENT DOCUMENTS

| | | | | |
|---|---|---|---|---|
| 7,062,505 | B2 * | 6/2006 | Lane et al. | 707/102 |
| 7,233,935 | B1 * | 6/2007 | Chandler | 706/47 |
| 2001/0034733 | A1 * | 10/2001 | Prompt et al. | 707/102 |
| 2004/0103393 | A1 * | 5/2004 | Reddy et al. | 717/122 |
| 2004/0126840 | A1 * | 7/2004 | Cheng et al. | 435/69.1 |
| 2005/0132305 | A1 * | 6/2005 | Guichard et al. | 715/855 |
| 2005/0165724 | A1 * | 7/2005 | West | 707/1 |
| 2005/0197867 | A1 * | 9/2005 | Edgett et al. | 705/5 |
| 2005/0246360 | A1 * | 11/2005 | Tanny et al. | 707/100 |
| 2005/0267887 | A1 * | 12/2005 | Robins | 707/9 |
| 2006/0005164 | A1 * | 1/2006 | Jetter et al. | 717/113 |
| 2006/0173865 | A1 * | 8/2006 | Fong | 707/100 |
| 2006/0288286 | A1 * | 12/2006 | Chandler et al. | 715/716 |
| 2007/0083554 | A1 * | 4/2007 | Crume | 707/104.1 |

OTHER PUBLICATIONS

"Mind Mapping in Executive Education: Applications and Outcomes"; Mento, et al; The Journal of Management Development; vol. 18, Issue 4, 1999, ISSN 0262-1711.
"Case Study MAITI; IT Information Management"; Mindjet GmbH, Germany; Internet; Oct. 2007; http://www.mindjet.com/pdf/us/case_studies/Mindjet_MAITI_US.pdf.
"HP OpenView NonStop Server Management Software"; Datasheet; Hewlett-Packard Development Company; 2003.
"Patrol® Enterprise Manager Features, Functions, and Technology Overview"; BMC Software, Inc.; Whitepaper; 2005.
"The Power of Patrol Enterprise Manager for More Effective Event Correlation"; Coleman; BMC Software, Inc.; Whitepaper; 2003.

* cited by examiner

*Primary Examiner* — Farhan Syed
(74) *Attorney, Agent, or Firm* — Rory D. Rankin; Meyertons, Hood, Kivlin, Kowert & Goetzel, P.C.

(57) ABSTRACT

A method for computer systems management using mind map techniques comprises receiving a request to generate a graphical summarization of relationships of a particular entity associated with an information technology (IT) infrastructure with other entities associated with the infrastructure, and generating a graphical representation of the particular entity and its relationships as a mind map comprising a plurality of linked nodes. The network of nodes may include a primary node representing the particular entity, a first link from the primary node to a first sub-network of nodes representing a first relationship, and a second link from the primary node to a second sub-network of nodes representing a second relationship.

23 Claims, 10 Drawing Sheets

COMPUTER SYSTEMS MANAGEMENT USING MIND MAP TECHNIQUES

This application claims the benefit of U.S. provisional patent application Ser. No. 60/695,041, entitled "COMPUTER SYSTEMS MANAGEMENT USING MIND MAP TECHNIQUES", filed Jun. 29, 2005.

BACKGROUND OF THE INVENTION

1. Field of the Invention

This invention relates to computer systems and, more particularly, to computer systems management tools.

2. Description of the Related Art

The complexity of managing computer systems has been increasing rapidly. Enterprise information technology (IT) infrastructures may include tens or hundreds of thousands of hardware and software entities, such as computer servers, workstations, storage devices, networking devices, application software instances, and the like. Mission-critical enterprise applications may be distributed over a large number of computer servers and storage devices, and may in some cases comprise multiple independent layers or tiers provided by different vendors. Even applications intended for single users (e.g., intended for execution on a single desktop or laptop computer) may incorporate components from multiple vendors, and may rely on numerous hardware and software devices. Typically, different hardware and/or software vendors whose products need to be managed within the IT infrastructure implement their own custom approaches to the presentation of status and the detection, diagnosis and resolution of problems and errors. In aggregate, the stream of raw detailed status or error-related data that may be generated in even a medium-sized IT infrastructure will eventually become too large for effective analysis. As a result of the numbers and diversity of the entities involved, even the basic systems management task of monitoring the status of hardware and software entities within an IT infrastructure, and responding efficiently to unexpected situations such as errors or failures, has become progressively more difficult and expensive over time. More complex systems management tasks such as providing desired quality of service, e.g., based on service level agreements tailored to individual IT customers or groups, have become even harder to accomplish efficiently and effectively.

The problem of effectively distilling information about IT infrastructure entities into a useful form is not restricted to a single group of users such as IT administrators. A number of different groups of users of an enterprise IT environment may be interested in viewing "useful" information about the IT environment, where the definition of "usefulness" may vary from group to group, and sometimes from individual to individual. For example, executive-level managers may wish to view information on the IT infrastructure in a way that illustrates return on investment and/or organizational responsibility—e.g., to answer questions like "How much additional revenue has been generated as a result of the expansion of our data center in France?" or "Which laboratory or test site is responsible for the software testing of Product X, on which we have received N critical customer complaints from our Platinum-level customers over the last three months?". IT administrative staff may be interested in information that relates more directly to anticipating and/or responding to operational hardware and software problems, such as answers to questions like "When are we likely to run out of storage space for database application D, based on the current rate of storage space usage?" or "How many tape devices should we devote to backup of critical data from data center C?". Engineering or support staff may be interested in details related to their specific tasks: e.g., to answer questions like "Where can I get instructions on installing database management system S on operating system O?" or "What is the set of backup-related tasks I need to complete before the planned release date of software product P from development organization V to system test organization T?". Each group or individual may prefer to manage their tasks using customized graphical views of "useful" relationships between various entities associated with IT infrastructures.

Traditional graphical techniques for summarizing systems management data have typically not been effective in meeting the diverse requirements of various groups of consumers of IT infrastructure information. For example, tree or list views are typically limited to representing containment or parent-child relationships, and may not work well when more than one type of relationship is to be represented. In addition, in some tree views where each parent-child link in a long chain of parent-child relationships may have to be individually traversed, a large number of "clicks" or "expand tree" operations may have to be performed before information of interest is obtained. Other techniques, such as various versions of Unified Modeling Language (UML) diagams or Entity Relationship (E-R) diagrams, may require users to learn a complex set of rules, standards or underlying theoretical principles, and may not be capable of easily representing arbitrary relationships or generating custom graphical representations that may be personalized by each individual user.

SUMMARY

Various embodiments of methods and systems for computer systems management using mind map techniques are disclosed. According to one embodiment, a method comprises receiving a request to generate a graphical summarization of relationships of a particular entity associated with an information technology (IT) infrastructure with other entities associated with the infrastructure, and generating a graphical representation of the particular entity and its relationships as a mind map comprising a plurality of linked nodes. The network of nodes may include a primary node representing the particular entity (which may typically be centrally located within a display of the mind map), a first link from the primary node to a first sub-network of nodes representing a first relationship, and a second link from the primary node to a second sub-network of nodes representing a second relationship. A wide variety of entities may be represented by the nodes of a mind map, include physical entities (e.g., hardware devices such as computer servers and storage devices), software (e.g., applications), organizational entities (e.g., departments or geographical regions where an enterprise or company may operate), tasks to be performed by a user, etc. Any type of relationship that is deemed useful by a user may be represented by the links of the mind map. For example, mind maps may be used to represent non-containment relationships—i.e., one or more of the relationships represented may not be strictly hierarchical parent-child relationships in some embodiments. Summary information on the entities represented by a sub-network may also be displayed in a mind map in some embodiments—for example, for a sub-network representing computer servers, the total number of servers that are currently operational, as well as the number that are currently unavailable, may be included in the summary. In addition, in some embodiments, a systems management tool may provide an interface allowing a user to perform one or more actions associated with an entity represented by a node of a mind map, such as restarting a failed server. Thus, mind maps may provide a highly flexible, easy-to-use interface for viewing and performing systems management-related actions on interrelated entities associated with IT infrastructures.

According to one embodiment, the method may include receiving the request for the graphical summarization from a user, and selecting at least some of the entities and/or relationships displayed in the mind map based on authorization privileges associated with the user. For example, IT administrators may be allowed to view detailed information on various entities represented in a mind map, and to perform various systems management actions such as initiating failover of an application or a server, while business users may be provided with less detailed information and may not be permitted to perform actions that could potentially result in inadvertent service downtime or data loss. In some embodiments, users may be allowed to specify certain attributes of entities represented in a sub-network that are to be summarized, and a summarization technique to be used (e.g., whether an event count is to be displayed in the summary, or an average value of some metric over a specified period, etc.). A region that includes summarized information obtained in accordance with the user specification may be displayed within the mind map.

According to another embodiment, the method may include obtaining information relating the particular entity to other entities from one or more databases, and regenerating the mind map in response to a change in the information in the databases. That is, the mind map (including summary regions) may be dynamically and/or automatically refreshed or redrawn when the underlying information in one or more databases changes. In some embodiments, the method may include providing an interface (such as a hypertext link) associated with a particular node of the mind map, and in response to input received via the interface, generating a new mind map with the particular node as the primary node. In other embodiments, the method may include providing a different interface (such as a double click of a mouse) associated with a particular node to regenerate the mind map with the particular node as the primary node.

In one embodiment, the method may include providing an interface allowing a user to customize a version of the mind map, e.g., by adding a representation of a new relationship and/or additional nodes. The customized version of the mind map may be displayed during the current session of user interaction, and metadata indicative of the customized version (e.g., the coordinates of various nodes within a display area, and/or information describing how data for the mind map may be obtained from one or more databases) may be stored in a persistent database. During a subsequent session of user interaction, the metadata may be retrieved from the database and the customized version automatically displayed to the user (e.g., without an explicit request from the user for the customized display).

Figure 1:
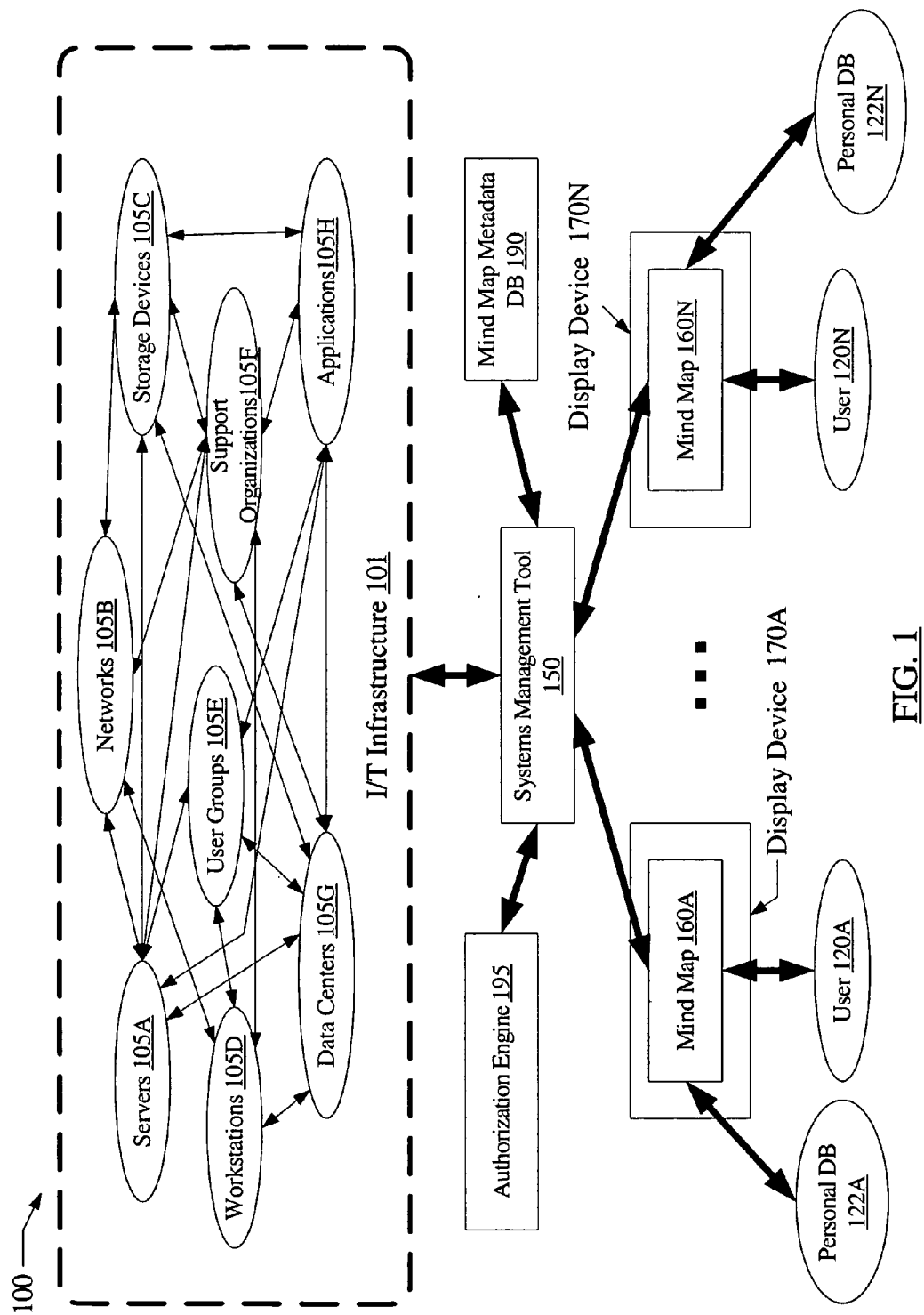
FIG. 1 is a block diagram illustrating one embodiment of a system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a block diagram illustrating a system 100 according to one embodiment. As shown, system 100 includes a systems' management tool 150 configured to receive a request from a user 120 (e.g., a user 120A or 120N) to generate a graphical summarization of relationships between a particular entity associated with an information technology (IT) infrastructure 101 and other entities associated with IT infrastructure 101. The particular entity and the other entities may each belong to any of a variety of groups of entities, e.g., interrelated entity groups 105A-105H shown in FIG. 1, or may be other entities of interest to the user 120 that are not shown in FIG. 1. The relationships may also be specified by the user 120, or may be obtained from one or more databases as described below in further detail. In response to the request, the systems management tool may be configured to generate a graphical representation of the particular entity and its relationships in the form of a mind map 160 (e.g., mind map 160A or 160N), and display the mind map to the requesting user 120. For example, in response to a request from user 120A, system management tool 150 may generate and display mind map 160A on a display device 170A, and in response to a request from a user 120N, system management tool 150 may generate and display mind map 160N on a display device 170N. Users 120 may perform a variety of actions on mind maps 160 in different embodiments, as also describe below in further detail: for example, mind maps 160 may be modified or customized, saved or made persistent (e.g., by storing metadata in mind map metadata database 190), shared among different users 120, or regenerated in various ways.

The term "mind map" is used herein to denote a graphical representation or view of a particular entity and its relationships to other entities as a network of nodes, including a primary node representing the particular entity and one or more sub-networks of nodes linked to the primary node, where each of the sub-networks represents a particular relationship between the particular entity and one or more other entities. Any type of relationship that is deemed useful by a user of a mind map may be represented in the mind map; for example, some relationships represented in a mind map (e.g., a relationship between a particular server and an organizational structure of an enterprise) may not represent containment relationships. The term "containment relationship", as used herein, refers to a hierarchical relationship in which, of each pair of related entities, one entity is logically and/or physically contained within the other. For example, the relationship of a parent directory in a file system to the set of files and child directories contained within the parent directory is a containment relationship. Containment relationships may also be referred to as "parent-child" relationships herein, and relationships that are not containment relationships may be termed "non-containment relationships" herein. In the context of computer systems management of an IT infrastructure 101, a user may in general associate any desired type of logical and/or physical entity with the IT infrastructure 101 for the purposes of his or her own work, and may define an arbitrary relationship between any given entity and any other entities associated with the IT environment 101 to be represented by a mind map 160. Summary information on groups of related nodes may also be displayed in the mind map, as described in further detail below. Examples of various entities that may be represented in a mind map 160 include the IT infrastructure itself (i.e., a single entity may be used to represent the entire I/T infrastructure), grouped entities such as computer servers 105A, networks 105B, storage devices 105C, workstations 105D, user groups 105E, support organizations 105F, data centers 105G, applications 105H, individual entities of each of the grouped entities 105, user tasks, grouped or individual documents or notes, geographical locations (sites, enclosures, buildings, rooms) or organizational groups (departments, divisions, groups) etc. The ability to define arbitrary relationships between entities of interest, and view the relationships and summarized information on groups of entities via a simple, intuitive graphical interface may provide a powerful technique to simplify various aspects of computer systems management, especially for large IT environments.

The particular entity whose relationships to other entities are the focus of a given mind map 160 may be termed the "primary node" of the mind map herein, and may typically be located centrally within the graphical representation or display of the mind map. The links that represent the relationships of the particular entity to other entities (which may be represented by other nodes of the mind map) may typically radiate outwards from the primary node in the graphical representation, as shown in FIG. 2-FIG. 6. As described below in further detail, mind maps may support a variety of features in various embodiments, such as dynamically updatable summarization features based on user-specified criteria, the ability to dynamically regenerate or redraw the mind map with a different node as the primary node, the ability to generate a new mind map via an interface such as a hypertext link, customization features, etc. In one embodiment, a mind map 160 may also include one or more graphical interfaces to initiate actions related to systems management, e.g., a menu-driven interface to initiate failover in response to a detection of a failed application or server, or to generate an e-mail message to a support organization. In addition, in some embodiments, graphical attributes such as icons of various types, color, width of lines representing links, fonts, etc. may be used as indicators of various properties of the entities and relationships being modeled, to help summarize status information, etc. For example, a color-coding scheme may be implemented in one embodiment, where the color of a particular node indicates a summary of the operational status of the entity represented by the node—e.g., the node may be shown as green if there are no known errors or warnings associated with the entity, yellow if at least one warning but no errors associated with the entity have been detected, and red if at least one error associated with the entity has been detected.

In order to generate a mind map 160, systems management tool 150 may be configured to retrieve information on the entities and their relationships from one or more databases, which may include formally managed databases (such as equipment inventory databases, human resources (HR) databases, etc.) as well as more informal or user-specific databases such as personal databases 122A or 122N in some embodiments. In one embodiment, systems management tool 150 may periodically or on demand retrieve the information from the databases, and dynamically refresh or regenerate one or more mind maps 160 when the information changes. For certain kinds of information displayed in a mind map (e.g., personal notes of a user, or other data that may not be persistently stored anywhere else), systems management tool 160 may simply save the information in metadata associated with the mind map, and may not have to access any external database. In one embodiment, before displaying certain types of information associated with one or more entities and/or relationships that may be represented in a mind map, systems management tool 150 may be configured to verify that a particular user 120 has sufficient authorization privileges to view and/or act on the information. That is, only those nodes and links that represent entities and relationships that a particular user 120 is authorized to view or interact with may be displayed to that user. Such authorization verification, which may be performed, for example, by the systems management tool 150 communicating with an authorization engine 195, may be particularly important in embodiments where the mind map includes interfaces to initiate systems management actions in response to various conditions, or when the mind map might include information that a particular user is not authorized to see.

In another embodiment, systems management tool 150 may save metadata indicative of customized or personalized versions of a mind map (e.g., links and nodes representing entities and relationships that may be of interest to a single user 120, preferred coordinates, colors, font sizes and other attributes of various nodes and links within a display region, information identifying databases from which data on entities and relationships may be gathered, personal notes, etc.) for one or more users 120 in a mind map metadata database 190. When a particular user 120 starts a new session of interactions with the systems management tool, previously saved metadata for that particular user may be retrieved from the mind map metadata database 190, and the customized or personalized version of the mind map may be displayed to the user. In some embodiments, information about user interaction sessions with the systems management tool 150 may be stored in mind map metadata database 190 even for users 120 who do not personalize their mind maps—e.g., cached authorization information for various users, or timestamps indicating when a user last viewed a mind map 160, may be stored in the mind map metadata database 190. Such information may be used, for example, to more efficiently perform authorization checks before displaying a mind map 160, or to determine whether to refresh a mind map based on how long ago the mind map was last refreshed.

Figure 2:
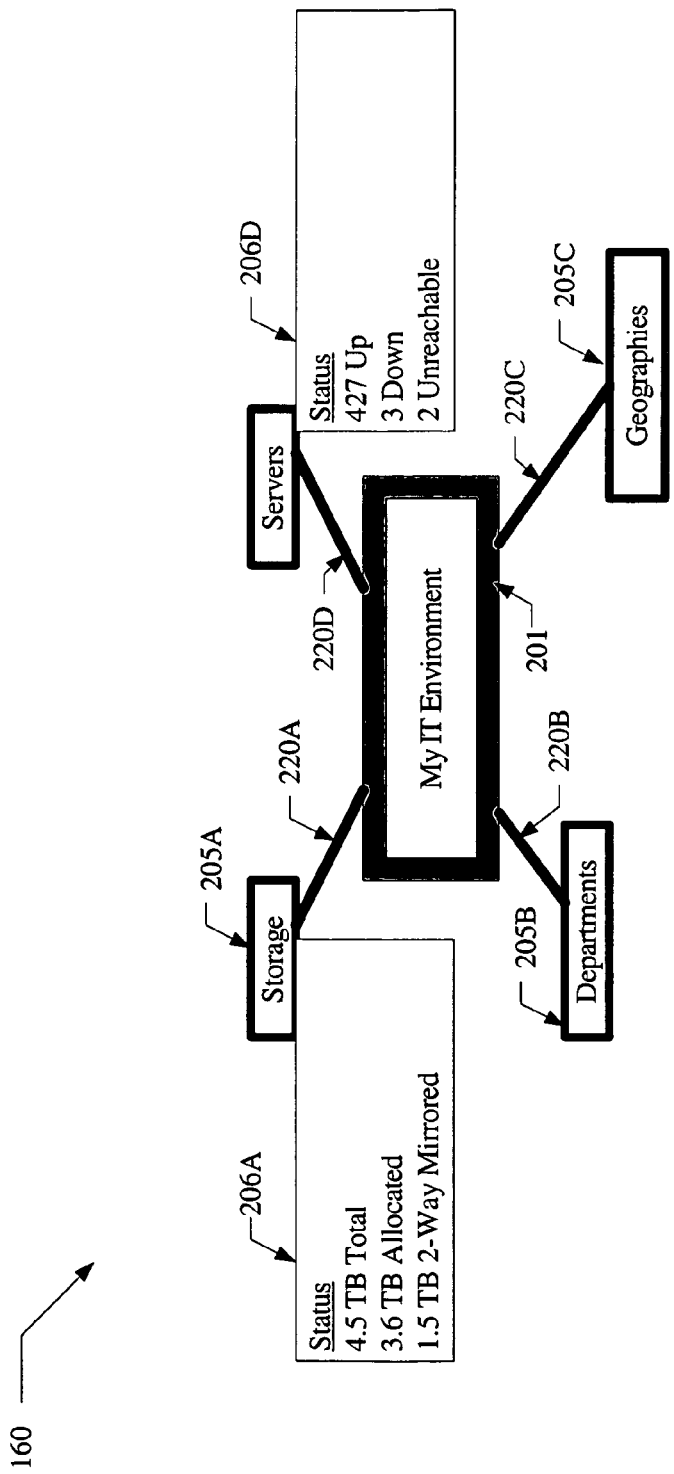
FIG. 2 is a block diagram illustrating an exemplary view of a mind map, according to one embodiment.

FIG. 2 is a block diagram illustrating an exemplary view of a mind map 160 (e.g., mind map 160A or 160N of FIG. 1), according to one embodiment. As shown, the mind map 160 includes a centrally located primary node 201 labeled "My IT Environment", and four links 220A-220D from primary node 201 to nodes 205A-205D respectively. Each of the nodes 205A-205D is shown in collapsed (i.e., un-expanded) form, and each represents a collection of entities that is related (from the perspective of at least one user 120) to the IT environment represented by primary node 201. Such collapsed nodes representing one or more hidden entities (i.e., entities that are not currently displayed, but may potentially be displayed in response to a request to expand a portion of the mind map) may be termed "aggregate nodes" herein. Node 205A is labeled "Storage" and may represent storage space on a collection of storage devices such as disks or disk arrays; node 205B is labeled "Departments" and may represent a management or organizational hierarchy within a company; node 205C is labeled "Geographies" and may represent a collection of geographical regions in which a company operates; and node 205D is labeled "Servers" and may represent a collection of computer servers in use in the IT environment. Nodes 205B and 205C may represent examples of relationships that are non-containment relationships. For example, the organizations represented by node 205B may include departments that are not part of a higher-level IT department, and while geographical regions represented by node 205C may be associated with the IT environment represented by node 201 (e.g., the hardware and software managed within the IT environment may be distributed among the regions), the association may not represent a parent-child relationship. Examples of details of the entities and relationships represented by an aggregate node 205 are provided below in conjunction with the descriptions of FIG. 3 and FIG. 4. Nodes 205 that are directly linked to the primary node 201 (i.e., via a single link 220) of a given mind map 160 may also be termed secondary nodes herein.

In some embodiments, one or more nodes of a mind map 160, such as aggregate nodes 205A and 205D in FIG. 2, may be displayed with an associated status summary region 206— e.g., status summary region 206A for node 205A and status summary region 206D for node 205D. A status summary region 206 may include context-specific summarized information on the entity or entities represented by the corresponding node. The summarized information may be derived, for example, by aggregating values for one or more attributes from nodes that are linked directly or indirectly to the aggregate node 205 (where the linked nodes may be reached by expanding the aggregate node as described below). Not all the nodes in the summarized portion of the mind map may share the same set of summarized attributes in some embodiments—for example, a first summarized attribute may be shared by all the nodes, a second summarized attributes may be shared by a subset of nodes, etc. In some embodiments, some nodes in the summarized portion may include attributes one or more attributes that are not summarized. In FIG. 2, for example, status summary region 206A indicates that a node 205A represents a total of 4.5 TB (terabytes) of storage, of which 3.6 TB is currently allocated, and 1.5 TB is currently mirrored using two-way mirroring. Each node linked to node 205A for which may include a storage size attribute from which the total storage may be derived, but only some nodes may include an attribute related to minoring in some embodiments. Also, status summary region 206D indicates that 427 servers are currently "up" (functioning normally), while three servers are "down" (in a failed state), and two servers are "unreachable" (i.e., systems management tool 150 is unable to determine the operational state of two servers). In one embodiment, the status summary information displayed in status summary regions 206 may be dynamically updated. In some embodiments, different portions of the mind map may be updated at different times, and an indication or timestamp of when the information was last obtained or summarized may also be optionally displayed within the status summary region. For example, a timestamp field may be added to a status summary region 206 or to one or more of the summary information fields, as desired. In other embodiments, the entire mind map may be updated dynamically in real time, or the entire mind map may be dynamically updated in a single transaction, so different timestamps for different regions may not be needed. In embodiments where one or more timestamps may be available for display, mind map users may be allowed to disable or enable timestamp display as desired (e.g., by setting user preferences, or by dynamically disabling timestamps using a graphical input interface). The specific types of information displayed in a status summary region may be customizable by a user 120 in some embodiments.

Figure 3:
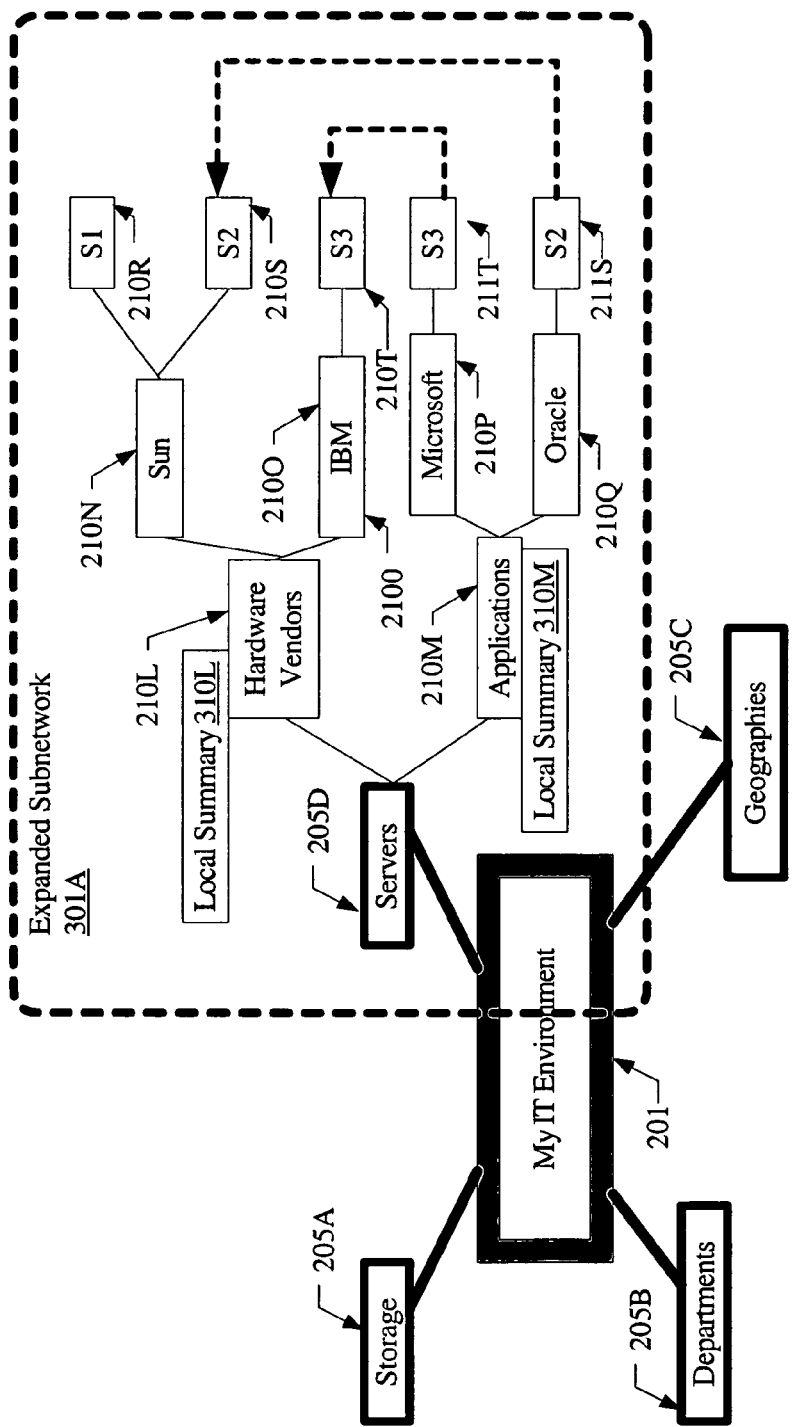
FIG. 3 is a block diagram illustrating an exemplary view of a mind map that includes an expanded sub-network, according to one embodiment.

Systems management tool 150 may be configured to provide one or more interfaces to allow a user 120 to issue a request to obtain refreshed or updated summary information in some embodiments (e.g., via a double-click of a mouse on a status summary region 206, or via a menu-driven interface). In response to input received via such an interface, systems management tool 150 may be configured to retrieve the latest status information or the latest summary of information (e.g., from one or more databases), and to modify one or more status summary regions 206 if the summary information has changed. In one embodiment, systems management tool 150 may be configured to retrieve raw or unsummarized status information from one or more databases, and to perform a summarization operation on the raw status information in order to generate the contents of a status summary region, while in other embodiments, the task of summarizing raw status information may be delegated to a module or layer of software external to systems management tool 150. In some embodiments, raw and/or summarized information may be "pushed" automatically to the display devices 170, e.g., based on a specified schedule such as once every 30 seconds, without requiring users to issue requests for updates. In one implementation, systems management tool 150 may be configured to provide users 120 an interface to specify one or more attributes of selected entities represented in the mind map 160, and to specify a summarization technique (e.g., whether the summary should include an average value of the attribute, a summed value, an occurrence count, etc.) to be used in generating summary information that is to be included in the status summary regions 206. It is noted that unlike trees and other strictly hierarchical graphical structures, mind maps may include loops (as illustrated in FIG. 3), so summarization techniques for mind maps may have to take the possibility of loops into account. In addition, a node representing the same object may appear in multiple locations in a given mind map in some embodiments, so care may have to be taken that the attribute values for such nodes are not counted twice in the summary'information. For example, if nodes representing storage were represented as "Application" nodes (depending on the application using a particular storage element or device) and "Storage Array" nodes (depending on the manner in which the storage was organized into array devices), the same storage device may well be represented by an Application node and also by a Storage Array node, and when computing summary information such as total storage size, the storage size for the storage device should not be counted twice.

FIG. 3 is a block diagram illustrating an exemplary view of a mind map 160 that includes an expanded sub-network 301, according to one embodiment. In FIG. 3, secondary node 205D (labeled "Servers") of the mind map 160 shown in FIG. 2 has been expanded to reveal sub-network 301 comprising a plurality of additional nodes 210L-210T linked directly or indirectly to node 205D. Nodes 210L-210T, each of which is linked to primary node 201 by two or more links, may be termed tertiary nodes herein. Two types of relationships between servers by represented by node 205D are indicated in sub-network 301: a categorization of servers by hardware vendor, and a categorization of servers by the vendors of software applications executing on the servers. Nodes 210L and 210M are labeled "Hardware Vendors" and "Applications" respectively to indicate these two categories. Nodes 210N and 210O, labeled "Sun" and "IBM" respectively, indicating two specific instances of hardware vendors, are linked to node 210L which represents the general category of hardware vendors. Nodes 210P and 210Q labeled "Microsoft" and "Oracle" respectively, indicating two specific application vendors, are linked to node 210M that represents the general category of software application vendors. Some of the nodes illustrated in FIG. 3 may be created and/or populated automatically by systems management tool 130 in some embodiments—e.g., based on one or more specified attributes. For example, based on a "hardware vendor" attribute specified by a user, systems management tool 150 may be configured to automatically discover entries for servers within an inventory database, and create nodes such as those labeled "Sun" and "IBM" and/or the nodes labeled "S1", "S2" etc. Nodes may also created by a user as an arbitrary group. The group may be populated by picking objects (entities) from a list of discovered items, or from another arbitrary group, or from categories or objects based on attributes (which may or may not have been auto-discovered). FIG. 3 includes nodes 210R, 210S and 210T representing computer servers 51, S2 and S3, respectively. The links shown in FIG. 3 between nodes 210N and 210O and nodes 210R-210T indicate that S1 and S2 are provided by Sun, and S3 is provided by IBM. In addition, to indicate that Microsoft applications are being run on S3, while Oracle applications are being run on S2, nodes 211S and 211T may also be included. Associations between nodes 211S and 210S (and between nodes 211T and 211S) may be indicated by specially marked links, such as the dotted line links shown in FIG. 3. In some embodiments, the specially marked links may not be shown, or may be hidden based on user preferences to reduce clutter. In other embodiments, instead of showing nodes 211S separately, an additional link between node 210Q and 210S may be shown—that is, nodes 211S and 210S may be collapsed into a single node. While system management tool 150 may support a display of multiple links between nodes of a mind map 160, in some implementations a limit on the maximum number of links from a given node may be enforced to help enhance the clarity of the display.

As noted earlier, in some embodiments, systems management tool 150 may be configured to obtain information on the relationships represented within a mind map 160 from one or more databases. For example, the nodes and links representing individual servers, hardware vendors and applications shown in sub-network 301 may be obtained from an equipment inventory database (e.g., from a set of tables of a relational database management system, or from a spreadsheet) in one implementation. Some nodes and links may be generated in response to manual interactions from one or more authorized users 120 in some embodiments. The determination of the specific relationships that are to be displayed in a sub-network, or in the mind map 160 as a whole, may also be performed either automatically (e.g., based on a default set of relationships and entities expected to be in frequent use in systems management of IT infrastructure, or based on customized parameter files read in by systems management tool on startup), or in response to user input received by systems management tool 150 in various embodiments. Customized local summaries of status for specified collections of nodes may also be provided by systems management tool 150 in some embodiments. For example, local summary region 310L may display summarized information on one or more attributes associated with the nodes in a sub-network rooted at node 210L (i.e., nodes 210N, 210O, 210R, 210S, and 210T) in accordance with a specified summarization technique, and local summary region 310M may display summarized information on nodes of a sub-network rooted at node 210M based on other attributes and a different summarization technique.

Figure 4:
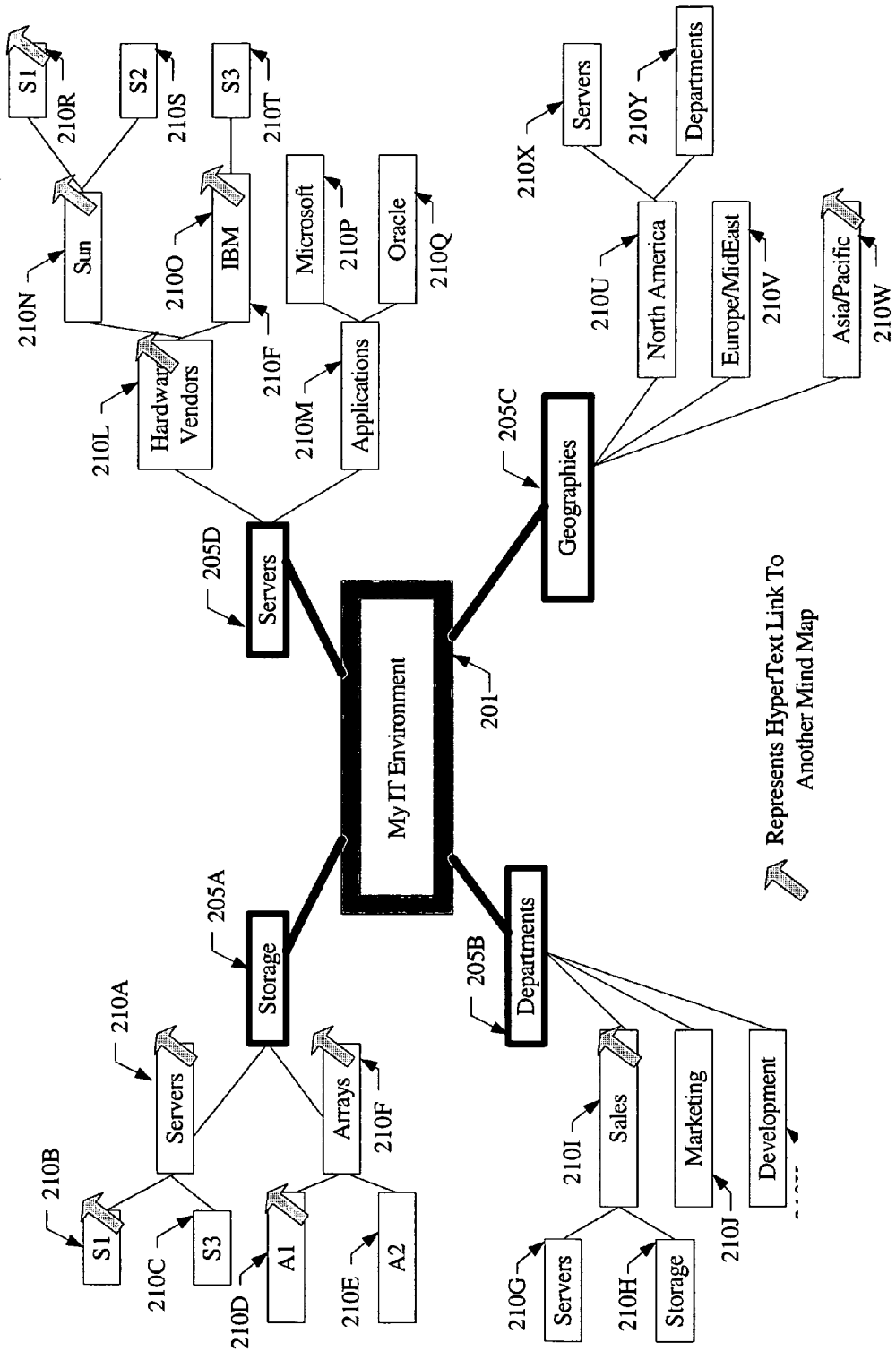
FIG. 4 is a block diagram illustrating an exemplary view of a mind map that includes multiple instances of a particular node, according to one embodiment.

FIG. 4 is a block diagram illustrating an exemplary view of a mind map 160 that includes multiple instances of a particular node, according to one embodiment. Expanded sub-networks corresponding to each of four secondary nodes 205A-205D linked to primary node 201 are shown in FIG. 4. Several entities or groups of entities are represented by more than one node in the example shown in FIG. 4: e.g., secondary node 205D and tertiary nodes 210A, 210G and 210X all represent groups of computer servers, and tertiary nodes 210B and 210R both represent the same individual computer server. Thus, in embodiments such as those depicted in FIG. 4, a given node may appear in more than one location within a mind map 160, indicating for example that the entity corresponding to the node may be related to other entities in more than one way. For example, groups of computer servers may be associated with particular departments, as indicated by the link between node 210G and 210I (representing the computer servers associated with a "Sales" department). In addition, groups of computer servers may be associated with geographical regions, as indicated by the link between node 210U and 210X (representing the servers of the "North America" region), or with storage accessed via the servers, as indicated by the link between node 210A and 205A. It is noted that in the case of nodes representing groups of entities (such as nodes 210A, 210G and 210X), one or more instances of the node may represent a different set of individual entities—e.g., in FIG. 4, not all the servers that may be associated with the Sales department may be located in North America, so the individual entities represented by nodes 210G and 210X may differ. Portions or all of the mind map depicted in the embodiment of FIG. 4 may be automatically generated and/or populated by systems management tool 150 in some embodiments, e.g., by looking up data from one or more databases in accordance with a set of rules or specifications provided by a user. Other portions (or entire mind maps) may be created and/or populated in response to specific user provided input in some embodiments, e.g., without automatic database accesses. Automatically generated or populated portions of mind maps may be overwritten or modified by users in some embodiments, e.g., to create custom mind maps for personal use or for sharing with other users.

Figure 5:
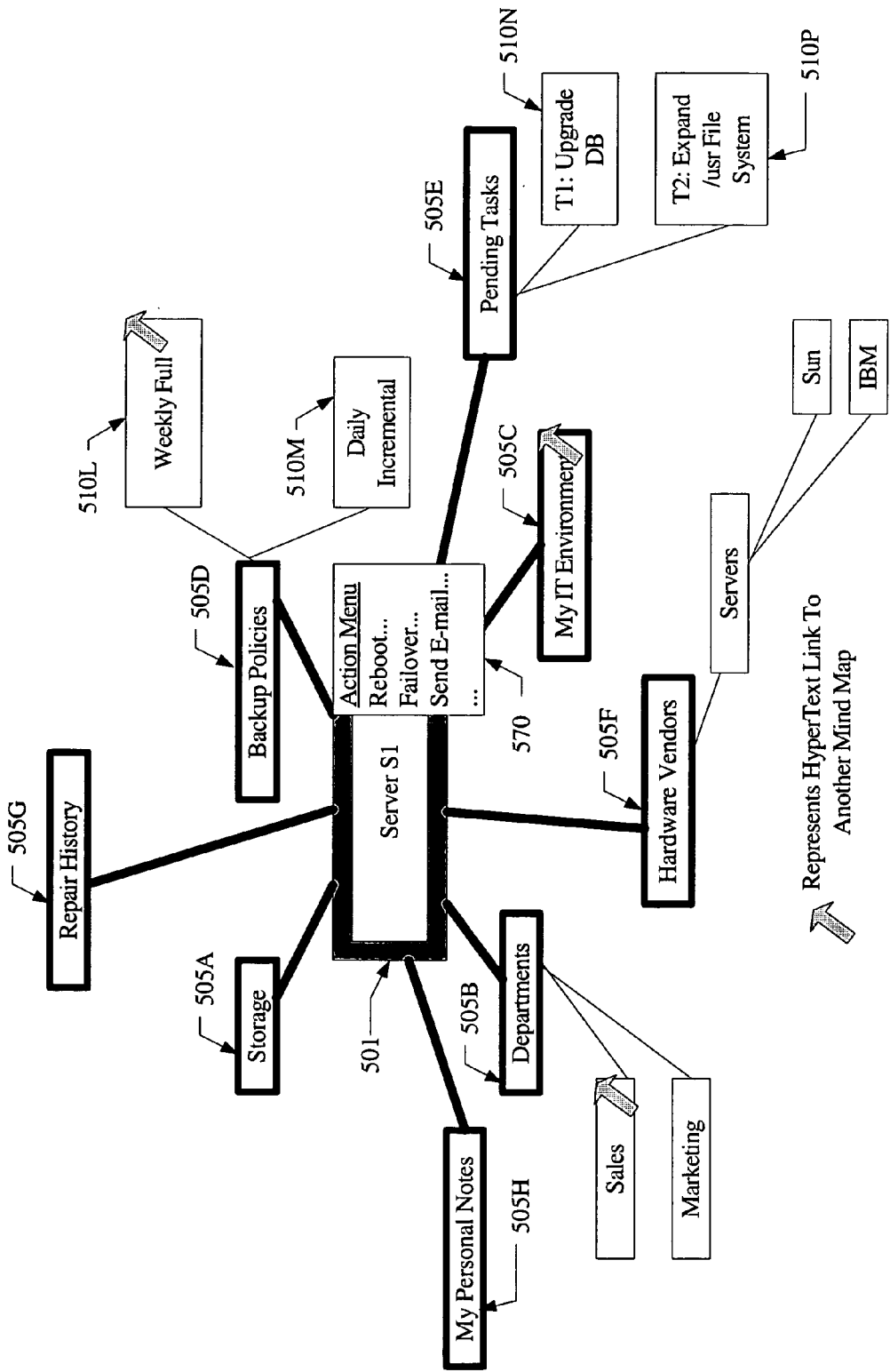
FIG. 5 is a block diagram illustrating an exemplary view of a new mind map that may be generated in response to user input on an interface associated with a node of an existing mind map, according to one embodiment.

The embodiment illustrated in FIG. 4 may also support the capability to open other mind maps using interfaces such as hypertext links, which are symbolized as shaded arrows in the figure. For example, if a user 120 clicks on a hypertext link associated with node 210B, systems management tool 150 may be configured to generate a display of a new mind map with a primary node corresponding to the entity represented by the node 210B with which the hypertext link was associated—i.e., in this example, the new mind map would have a primary node that represented server S1. The new mind map may also include one or at most a few layers of nodes linked to the primary node, instead of being shown fully expanded, so that the display is relatively uncluttered. The new mind map may be one that is or was automatically generated by systems management tool 150, or may be a mind map that was created by a user, or modified by a user after being automatically generated. Different users may customize one or more mind maps that may be displayed via hyperlinks (e.g., by adding/deleting nodes, changing the layout or summary information, etc.), and may save their customized versions in some embodiments. In such embodiments, a click on a hyperlinked node by one user may generate a different mind map than a click on the corresponding hyperlink by another user. An example of such a new mind map generated as a result of a click on a hypertext link in an existing mind map is shown in FIG. 5. Not all the nodes in a given mind map may support hypertext links (or the equivalent interface) to generate new mind maps in some embodiments, and users 120 may be provided the ability to add hypertext links to other mind maps as desired in other embodiments. It is noted that in one embodiment, clicking on the hypertext link associated with node 210R of FIG. 4 (which also represents server S1) may also result in systems management displaying the same new mind map that is displayed when the hypertext link associated with node 210B. It is also noted in some embodiments, interfaces other than hypertext links may be used to generate new mind maps centered on a particular node—for example, a right-click of a mouse, or a combination of keys on a keyboard with a mouse click, may be used in such embodiments.

FIG. 5 illustrates an exemplary view of a new mind map 160 that may be generated in response to user input on an interface associated with a node of an existing mind map (such as a hypertext link associated with a node representing server S1, such as node 210B or 210R, in FIG. 4) according to one embodiment. The new mind map may be displayed, for example, within a new window or region of a display device 170. In FIG. 5, the primary node 501 represents the entity (server S1) at which the user input in the original mind map (e.g., the mind map illustrated in FIG. 4) was directed. Some of the nodes displayed in the new mind map may represent entities that were also displayed in the original mind map. For example, the entity represented by the primary node 201 of the original mind map, labeled "My IT Environment", may be represented as a secondary node 505C in the new mind map, and may itself have an associated hypertext link that may be used to regenerate the original mind map. Secondary nodes 505A, 505B and 505F, labeled "Storage", "Departments" and "Hardware Vendors" may also represent entities that were displayed in the original mind map. It is noted that the number of links between two nodes of the new mind map (e.g., primary node 501 and node 505C) may differ from the number of links that connected the corresponding nodes in the original mind map (e.g., the links connecting primary node 201 node 210R of FIG. 4). This ability to display "short cut" versions of relationships may represent another distinctive feature of mind maps 160; other hierarchical or tree-based graphical structures may strictly enforce parent-child relationships, so it may not be possible to bypass intermediate nodes in a chain of linked nodes in such hierarchical structures.

Other nodes and sub-networks in the new mind map may represent entities that were not included in the original mind map, such as "Backup Policies" (node 505D), "Repair History" (node 505G), "Pending Tasks" (node 505E) and "My Personal Notes" (node 505H). Some of the sub-networks, such as the sub-network starting at node 505D related to "Backup Policies", may represent information associated with the primary node that may be shared by multiple users. For example, since backup policies associated with server S1 may be of interest or use to several users 120, a sub-network with backup policy information may be displayed, as needed or requested, in various default or personalized mind maps that have S1 as the primary node. Other information displayed in the mind map may be user-specific—for example, "Pending Tasks" may represent a set of tasks that a particular user has to perform, such as upgrading a database at server S1 (node 510N) and expanding a file system (node 510P), and "My Personal Notes" may include notes or comments that are only of use to a particular user. In one embodiment, such user-specific information may be obtained by systems management tool from personal databases 122 (shown in FIG. 1) associated with one or more users 120.

Action menu 570 shown in FIG. 5 illustrates another feature that may be implemented for mind maps 160 in some embodiments. In response to user input for a selected node (such as primary node 501 in FIG. 5), systems management tool 150 may be configured to initiate one or more systems management actions. For example, as shown in action menu 570, a set of possible systems management actions that may be performed on the server S1 represented by node 501 may include rebooting the server, initiating a failover to some other server, sending e-mail related to the server to an individual or group, etc. The action menu may be displayed in response to a variety of different user inputs in various embodiments, such as a left-click on node 501 (for selection), followed by a right-click (for displaying the action menu). Selecting a particular action on the action menu 570 may in turn lead to additional interfaces being displayed (e.g., a window providing a set of potential failover servers from which one may be selected, or an e-mail client display) in some embodiments, some of which may require further user input. The specific actions that may be displayed in an action menu 570 may vary from one user 120 to another: for example, in one embodiment, systems management tool 150 may be configured to ensure (e.g., by communicating with authorization engine 195) that a particular user 120 has the appropriate authorization privileges for each action that may be initiated from the action menu.

In order to generate a new mind map such as the one shown in FIG. 5, systems management tool 150 may be configured to retrieve metadata (e.g., the coordinates for various nodes, attributes such as colors, fonts, etc.) for the new mind map from mind map metadata database 190 in some embodiments, as well as updated data representing the current state of entities and relationships from one or more other databases. It is noted that in one embodiment, metadata associated with various mind maps may be cached locally at each host where a display may have to be provided—e.g., systems management tool 150 may be configured to maintain metadata caches within various host memories.

Figure 6:
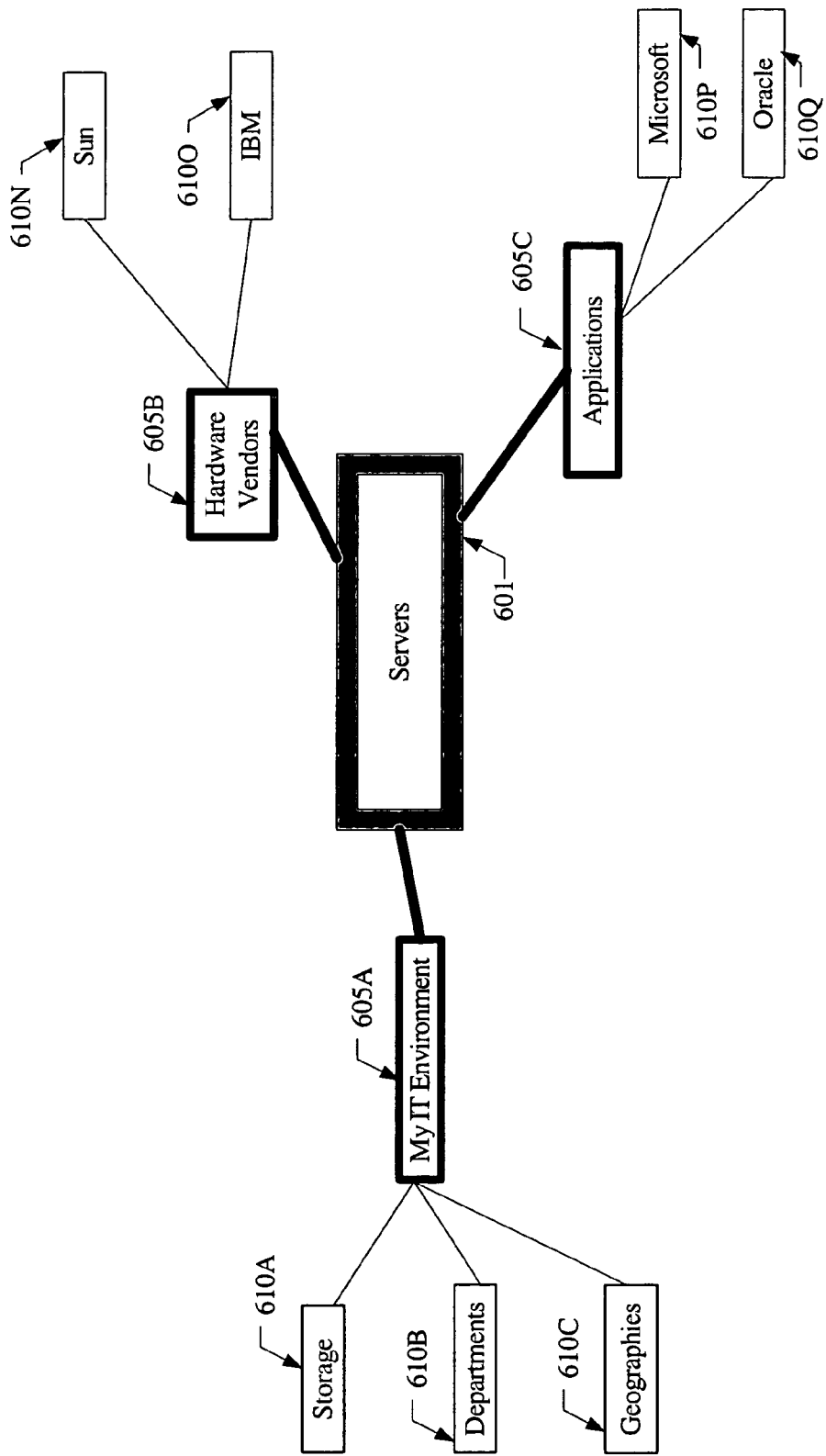
FIG. 6 is a block diagram illustrating a regenerated mind map, according to one embodiment.

In one embodiment, systems management tool 150 may also allow a user to request a regeneration of an existing mind map, where the regenerated version is centered on a different primary node. For example, in response to user input via an interface such as a double-click using a mouse, a user of the mind map shown in FIG. 4 may request a regeneration of the mind map with node 205D as the primary node. FIG. 6 is a block diagram illustrating a regenerated mind map using such an interface, according to one embodiment. In regenerating the mind map, in some implementations, systems management tool 150 may be configured to simply redraw the mind map with a specified node as the new primary node, without adding additional nodes or links that were not present in the original mind map. For example, because node 205D ("Servers") was directly linked to nodes 201 ("My IT Environment"), 210L ("Hardware Vendors") and 210M ("Applications") in the original mind map shown in FIG. 4, the primary node 601 ("Servers") in the regenerated mind map shown in FIG. 6 is also linked to three nodes representing the same three entities—i.e., node 605A ("My IT Environment"), 605B ("Hardware Vendors") and 605C ("Applications"). In some embodiments, portions of redrawn mind maps may be automatically populated by systems management tool 150 based on one or more specified attributes—e.g., when a user clicks on a node labeled "Sun", the tool may be configured to gather information on all the Sun servers from one or more databases and display them as linked to the new primary node "Sun" in the regenerated map. Such an ability to redraw or regenerate existing mind maps may help users to focus in on entities and relationships of primary interest, while still keeping the display relatively uncluttered, and retaining the ability to view all the information that was originally represented (e.g., by regenerating the original mind map or any other desired version).

Figure 7:
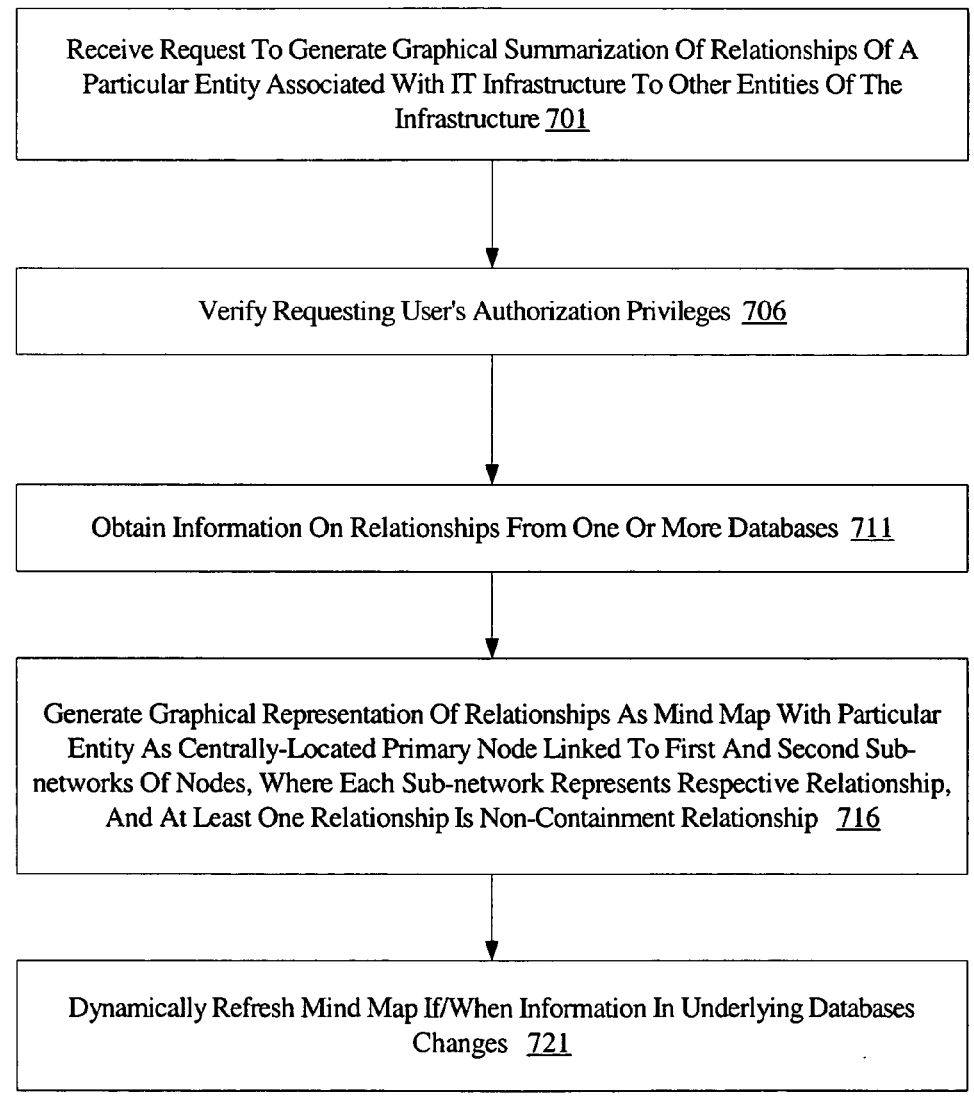
FIG. 7 is a flow diagram illustrating aspects of the operation of a systems management tool, according to one embodiment.

FIG. 7 is a flow diagram illustrating aspects of the operation of systems management tool 150, according to one embodiment. Systems management tool 150 may be configured to receive a request to generate a graphical summarization of the relationships of a particular entity associated with an IT infrastructure 101 to other entities associated with the IT infrastructure (block 701 of FIG. 7). The request may be generated by or on behalf of a user 120 using a variety of techniques in different embodiments—e.g., in response to a selection of an icon representing the particular entity, to an activation of a particular step of a multi-step mind map generating "wizard" tool, to a mouse click on a hypertext link, or to a command issued via a command-line. In response to the request, systems management tool 150 may be configured to verify or obtain the requesting user's authorization privileges (block 706)—for example, by providing an identification (such as a login id) of the user 120 to authorization engine 195, and obtaining a list of roles and/or privileges granted to the user or to a user group to which the user belongs. Different users or user groups may be granted different privileges related to systems management—for example, data center administrators may be granted the ability to view all available data and perform a variety of actions such as rebooting systems, taking systems offline, initiating failovers, etc., while business users or financial staff may only be given privileges to view a limited set of information related to the IT infrastructure 101, such as the names or e-mail addresses of staff responsible for maintaining various services or servers.

Systems management tool 150 may be configured to obtain information on the particular entity and its relationships to other entities from one or more databases (block 711). Any desired combination of formally maintained databases, such as data center inventory databases, and informal or personal databases, may be accessed to obtain the information. In one embodiment, the user's authorization privileges may be used to restrict systems management tool 150 to a subset of available databases and/or to limit the specific data that may be obtained from a given database. In other embodiments, the data that is obtained from the databases may be the same for different users, but the data that is actually displayed (in operations corresponding to step 716) may be limited based on the user's authorization privileges. In some embodiments, systems management tool 150 may be pre-configured to access one or more default databases relevant to a particular IT infrastructure where the tool is being deployed. In such embodiments, when a user 120 creates a first version of a mind map 160, the user may be allowed to choose from among one or more default databases of which systems management tool 150 is already aware, and may optionally be allowed to specify (e.g., provide information allowing systems management tool 150 to obtain information from) additional databases such as personal databases 122.

After the information is obtained, systems management tool 150 may be configured to generate the graphical representation as a mind map (block 716), with a centrally located primary node representing the particular entity, and sub-networks linked to the primary node representing the relationships of the particular entity to other entities. It is noted that in general, mind maps 160 may be used to represent any combinations of different kinds of relationships—for example, all the relationships represented in a first mind map may be containment relationships, all the relationships represented in a second mind map may be non-containment relationships, and the relationships represented in a third mind map may include both containment and non-containment relationships. In the embodiment depicted in FIG. 7, at least one of the relationships may be a non-containment relationship. Systems management tool 150 may be configured to dynamically refresh the information that is displayed in the mind map 160 if/when the underlying information in the databases changes (block 721). In some implementations, for example, systems management tool 150 may provide an input parameter to allow users 120 to specify the intervals at which the databases may be accessed to determine whether the displayed data needs to be modified. In other implementations, systems management tool 120 may provide one or more interfaces (e.g., via a command menu) allowing users to dynamically request that the databases be accessed to refresh the display or ensure that it is up-to-date.

In various embodiments, the operations illustrated in FIG. 7 may be performed in a different order or omitted entirely—for example, in one embodiment, a check of a user's authorization privileges may be made after information on the entities and relationships is obtained from the databases, i.e., operations corresponding to block 711 may be performed prior to operations corresponding to block 706. In some embodiments, where a user may issue a request to view an existing mind map previously saved by the same user, systems management tool 150 may determine that no new authorization verification is necessary, and the operations corresponding to block 706 may be omitted. In addition, in some implementations, dynamic refresh of the mind map (i.e., operations corresponding to block 721) may not be supported.

Figure 8:
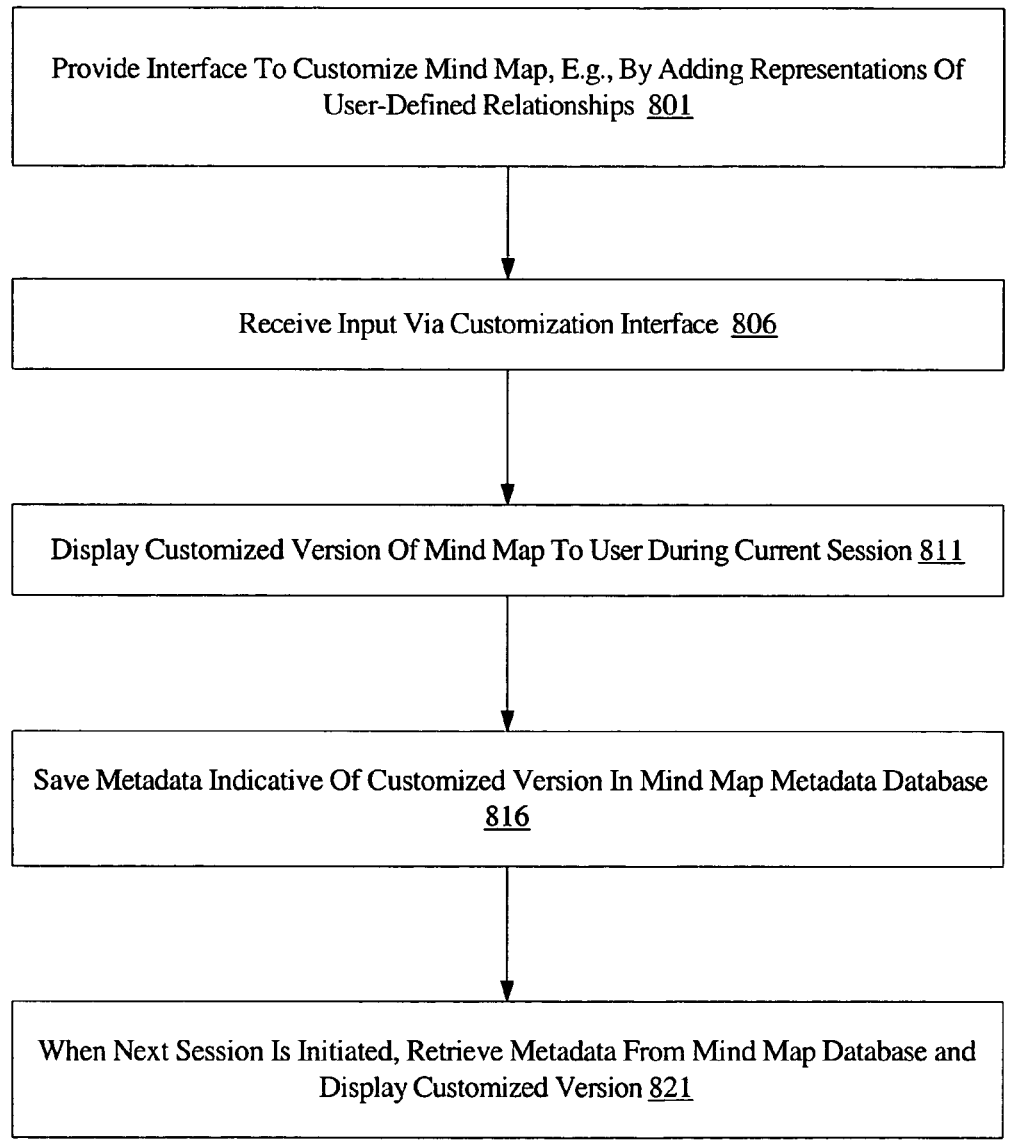
FIG. 8 is a flow diagram illustrating further aspects of the operation of a systems management tool, according to one embodiment where customization of mind maps is supported.

FIG. 8 is a flow diagram illustrating further aspects of the operation of systems management tool 150, according to one embodiment where customization of mind maps is supported. As shown in block 801 of FIG. 8, systems management tool may be configured to provide an interface allowing a user 120 to customize an existing mind map 160, for example by defining new relationships between entities and adding representations of the new relationships to the mind map. In some cases, the new relationships may be between entities that are already represented in the mind map, while in other cases, the user 120 may add new entities (i.e., new nodes) to the mind map, and the new relationships may be between nodes representing an expanded set of entities. In some embodiments, when customizing the mind map, the user may also be prompted by systems management tool 150 to provide specific information allowing data on the new relationships to be obtained from an underlying database. For example, in an implementation where systems management tool 150 is configured to access a relational database where information on the new entities or relationships is stored, the user may be prompted, e.g., via a multi-step "Add Data Source" wizard associated with the mind map, to identify the relational database, and/or to provide other information such as a database user identifier and password. In some implementations, systems management tool 150 may provide an application programming interface (API) for customization and for linking to databases, e.g., using a standard database access interface such as JDBC (Java Data Base Connectivity). In addition to allowing users to introduce new relationships and/or entities, systems management tool may also allow other types of customization in some implementations—e.g., modification of icons, fonts, colors etc. used in the mind map, moving nodes from one location to another, modifying or removing summary areas, changing the attributes that are summarized for a particular set of nodes, etc.

In response to input received via the customization interface (block 806 of FIG. 8), systems management tool 150 may modify the mind map being displayed to the user 120 during the current session of interaction between the user 120 and the systems management tool (block 811). In addition, for example in response to a "Save" or "Save As . . . " command issued by the user, systems management tool 150 may be configured to save metadata associated with the customized version of the mind map in mind map metadata database 190 (block 816). The metadata may include graphical attributes of the mind map (e.g., the coordinates of the nodes in the customized version of the mind map, colors, fonts, icons, used in the customized version, etc.) as well as functional attributes such as identification of databases from which information represented in the mind map is gathered, refresh intervals, etc. During a subsequent session of interaction with the same user, systems management tool 150 may be configured to retrieve the metadata from mind map metadata database 190, and display the customized version of the mind map to the user, e.g., without receiving an explicit request for the customized version. Thus, systems management tool 150 may be configured to retain information on user-specific preferences related to mind maps across user sessions in some embodiments.

Figure 9:
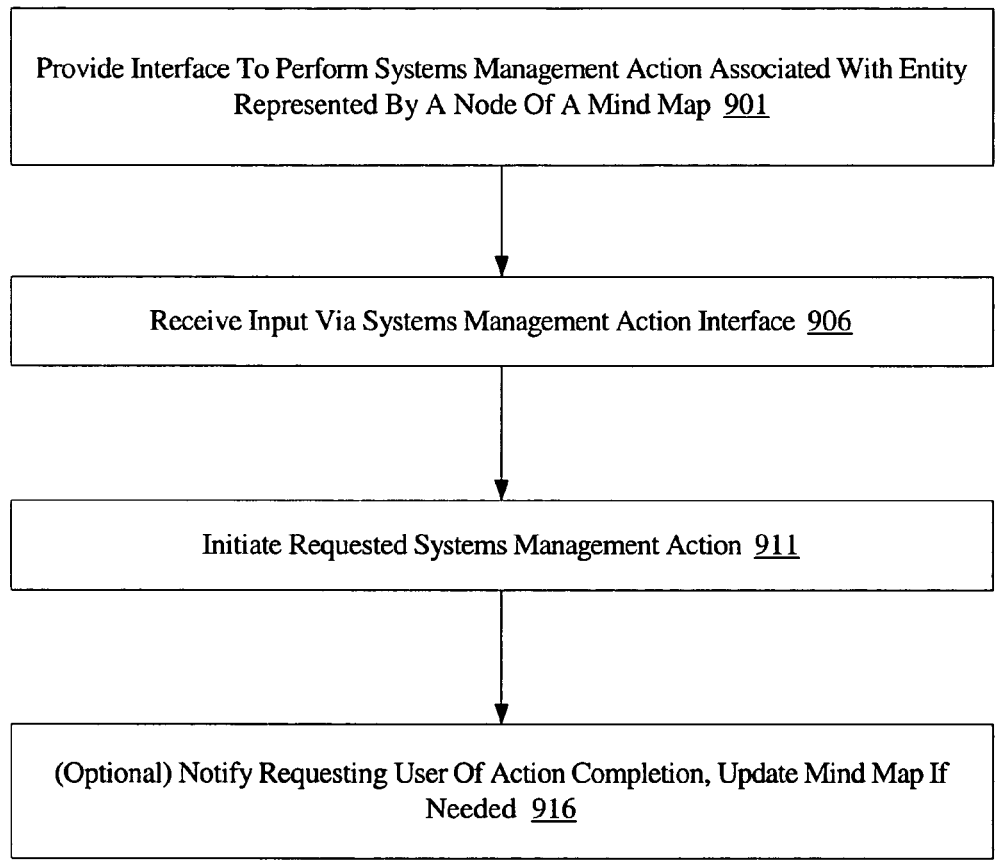
FIG. 9 is a flow diagram illustrating further aspects of the operation of a systems management tool according to one embodiment where users may be allowed to initiate systems management actions associated with one or more nodes displayed in a mind map.

FIG. 9 is a flow diagram illustrating further aspects of the operation of systems management tool 150 according to one embodiment where users may be allowed to initiate systems management actions associated with one or more nodes displayed in a mind map 160. As shown in block 901 of FIG. 9, systems management tool 150 may provide an interface (such as action menu 570 shown in FIG. 5) associated with a mind map node, from which a user may choose to select and initiate a systems management action related to an entity represented by the node. Examples of possible actions that may be initiated using such an interface may include rebooting a server, failing over a server or an application, disconnecting or reconnecting a host or a storage device to a network, flushing a cache, sending an e-mail or query related to an entity, etc. The specific actions that a user may be allowed to initiate via the interface may be limited by the user's authorization privileges—e.g., only an administrator may be allowed to reboot a server, while other users may be allowed to send e-mail about a specific problem related to the server. In response to input received via the interface (block 906), systems management tool 150 may be configured to initiate the selected systems management action (block 911). In some embodiments, systems management tool 150 may optionally be configured to notify the user that requested the action when the action completes (block 916) and/or to refresh the display of the mind map to reflect the occurrence or completion of the action. For example, if the systems management action results in a server being taken offline, a summary region associated with a sub-network of servers may be updated to reflect the disabling of the server, and/or one of the attributes of the node representing the server may be modified in the display of the mind map (e.g., the node may be "greyed out" to indicate the disabling).

Figure 10:
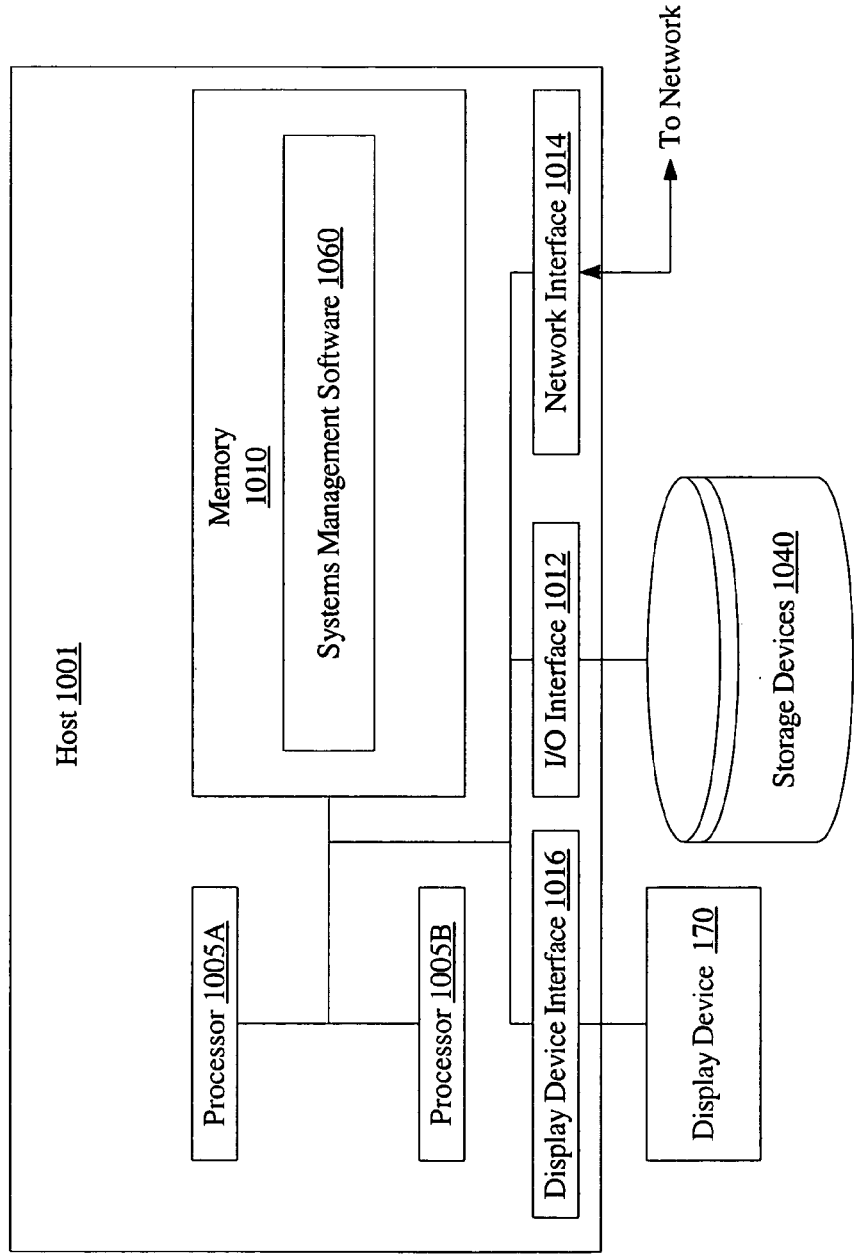
FIG. 10 is a block diagram illustrating constituent elements of a computer host, according to one embodiment.

FIG. 10 is a block diagram illustrating constituent elements of a computer host 1001, according to one embodiment. As shown, host 1001 may comprise one or more processors such as processors 1005A and 1005B coupled to one or more memories such as memory 1010. Processors 1005A and 1005B may be implemented using any desired architecture or chipset, such as the SPARC™ architecture from Sun Microsystems or the x86-compatible architectures from Intel Corporation, Advanced Micro Devices, etc. Systems management software 1060 comprising program instructions that may be executable to implement the functionality of system management tool 150 as described above may be partly or fully resident within a memory 1010 at a given point in time. In addition, in some embodiments, computer host 1001 may be configured to emulate or simulate one or more virtual machines (e.g., one or more virtual machines such as a Java virtual machine (JVM) may be executed using program instructions included within memory 1010). Memory 1010 may be implemented using any appropriate medium such as any of various types of RAM (e.g., DRAM, SDRAM, RDRAM, SRAM, etc.). Host 1001 may also include one or more I/O interfaces 1012 providing access to storage devices 1040, one or more network interfaces 1014 providing access to a network, and one or more display device interfaces 1016 providing access to a display device 170. A display device 125 may be implemented using any desired display technology, such as Cathode Ray Tube (CRT) technology, Liquid Crystal Display (LCD) technology, etc. In some embodiments, display devices 170 may be geographically distributed—for example, systems management tool 150 may run at a particular host 1001 at a particular data center, while at least some of the display devices 170 at which end users 120 view mind maps 160 may be located at remote data centers, so that the information displayed in the mind maps may be sent over a Wide Area Network to some of the displays.

Part or all of the program instructions that may be executable to implement the functionality of system management tool 150 may also be stored within storage devices 1040. In addition to systems management software 150, memory 1010 and/or storage devices 1040 may also store operating systems software, software for various applications such as databases (including personal databases 122), and/or authorization engine 195 in various embodiments. In some embodiments, systems management software 1060 may be included within an operating system, a storage management software product or another software package, while in other embodiments, systems management software 1060 may be packaged as a standalone product. In some embodiments, part or all of the functionality of systems management tool 150 may be implemented via one or more hardware devices (e.g., via one or more Field Programmable Gate Array (FPGA) devices) or in firmware. Storage devices 1040 may include any desired type of persistent and/or volatile storage devices, such as individual disks, disk arrays, optical devices such as CD-ROMs, CD-RW drives, DVD-ROMs, DVD-RW drives, flash memory devices, various types of RAM and the like. One or more storage devices 1040 may be directly coupled to host 1001 in some embodiments (e.g., using the Small Computer Systems Interface (SCSI) protocol), or may be accessible over any desired storage interconnect such as a fiber channel fabric or storage area network (SAN) in other embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
receiving a request to present a graphical summarization of relationships of a particular entity associated with an information technology (IT) infrastructure to other entities associated with the IT infrastructure;
generating a graphical representation of the particular entity and its relationships to selected other entities associated with the IT infrastructure as a mind map comprising a network of nodes, wherein the network of nodes includes:
a primary node representing the particular entity;
a first link from the primary node to a first sub-network of nodes representing a first relationship of the particular entity to a first set of the selected other entities, wherein the first relationship is a non-containment relationship; and
a second link from the primary node to a second sub-network of nodes representing a second relationship of the particular entity to a second set of the selected other entities;
wherein the first sub-network is represented as an aggregate node with an accompanying status summary region; and
providing an interface which allows a user to specify a content of said status summary region.

2. The method as recited in claim 1, further comprising:
receiving the request from a user; and
selecting the entities of the first and second sets based at least partly on a set of authorization privileges associated with the user.

3. The method as recited in claim 1, wherein at least one entity of the first set of the selected other entities also belongs to the second set of selected other entities.

4. The method as recited in claim 1, wherein the status summary region includes a dynamically updated summary of status information related to the first set of the selected other entities.

5. The method as recited in claim 4, further comprising:
providing an interface to specify one or more attributes of the entities of the first set and a summarization technique for each of the selected one or more attributes; and
in response to input received via the interface, summarizing values of the one or more attributes according to the summarization technique, and including the summarized values in the dynamically updated summary.

6. The method as recited in claim 4, further comprising:
providing an interface to provide an expanded version of the first sub-network; and
in response to input received via the interface, displaying an expanded version of the first sub-network, wherein the expanded version includes local status information for at least one entity represented by a node of the first sub-network.

7. The method as recited in claim 1, wherein the primary node is displayed centrally within a display area.

8. The method as recited in claim 1, further comprising:
providing an interface to select a particular node of the first sub-network of nodes to be a primary node in a regenerated version of the mind map; and
in response to input received via the interface, preparing a regenerated version of the mind map with the particular node as the primary node.

9. The method as recited in claim 1, further comprising:
providing an interface to select a particular node of the first sub-network of nodes to be the primary node of a second mind map; and
in response to input received via the interface, generating a second mind map with the particular node as the primary node of the second mind map.

10. The method as recited in claim 1, further comprising:
obtaining information relating the particular entity to entities represented in the first sub-network from one or more databases, and
regenerating the mind map upon a detection of a change in the information.

11. The method as recited in claim 1, further comprising:
providing an interface allowing a user to customize a version of the mind map during a first session of interaction with a systems management tool, wherein the customized version includes a representation of a new relationship defined by the user; and
displaying the customized version of the mind map during a remainder of the first session.

12. The method as recited in claim 11, further comprising:
saving metadata indicative of the customized version in a persistent database; and
in response to a request from the user during a second session of interaction with the systems management tool,
retrieving the metadata from the persistent database; and
displaying the customized version of the mind map in accordance with the metadata.

13. The method as recited in claim 1, further comprising:
providing an interface to select a particular systems management action associated with a particular node of the first sub-network; and
in response to input received via the interface, initiating the systems management action.

14. A system comprising:
a processor; and
memory coupled to the processor, wherein the memory stores program instructions computer-executable by the processor to implement a system management tool configured to:
receive a request to present a graphical summarization of relationships of a particular entity associated with an information technology (IT) infrastructure to other entities associated with the IT infrastructure;
generate a graphical representation of the particular entity and its relationships to selected other entities associated with the IT infrastructure as a mind map comprising a network of nodes, wherein the network of nodes includes:
a primary node representing the particular entity;
a first link from the primary node to a first sub-network of nodes representing a first relationship of the particular entity to a first set of the selected other entities, wherein the first relationship is a non-containment relationship; and
a second link from the primary node to a second sub-network of nodes representing a second relationship of the particular entity to a second set of the selected other entities;

wherein the first sub-network is represented as an aggregate node with an accompanying status summary region; and provide an interface which allows a user to specify a content of said status summary region.

15. The system as recited in claim 14, wherein the systems management tool is further configured to:
   receive the request from a user; and
   select the entities of the first and second sets based at least partly on a set of authorization privileges associated with the user.

16. The system as recited in claim 14, wherein the status summary region includes a dynamically updated summary of status information related to the first set of the selected other entities.

17. The system as recited in claim 16, wherein the systems management tool is further configured to:
   provide an interface to specify one or more attributes of the entities of the first set and a summarization technique for each of the selected one or more attributes; and
   in response to input received via the interface, summarize values of the one or more attributes according to the summarization technique, and including the summarized values in the dynamically updated summary.

18. The system as recited in claim 16, wherein the systems management tool is further configured to:
   obtain information relating the particular entity to entities represented in the first sub-network from one or more databases, and
   regenerate the mind map upon a detection of a change in the information.

19. A non-transitory computer readable medium comprising program instructions wherein the instructions are computer-executable:
   receive a request to present a graphical summarization of relationships of a particular entity associated with an information technology (IT) infrastructure to other entities associated with the IT infrastructure;
   generate a graphical representation of the particular entity and its relationships to selected other entities associated with the IT infrastructure as a mind map comprising a network of nodes, wherein the network of nodes includes:
      a primary node representing the particular entity;
      a first link from the primary node to a first sub-network of nodes representing a first relationship of the particular entity to a first set of the selected other entities, wherein the first relationship is a non-containment relationship; and
      a second link from the primary node to a second sub-network of nodes representing a second relationship of the particular entity to a second set of the selected other entities;
      wherein the first sub-network is represented as an aggregate node with an accompanying status summary region; and
   provide an interface which allows a user to specify a content of said status summary region.

20. The computer readable medium as recited in claim 19, wherein the instructions are further computer-executable to:
   receive the request from a user; and
   select the entities of the first and second sets based at least partly on a set of authorization privileges associated with the user.

21. The computer readable medium as recited in claim 19, wherein the status summary region includes a dynamically updated summary of status information related to the first set of the selected other entities.

22. The computer readable medium as recited in claim 21, wherein the instructions are further computer-executable to:
   provide an interface to specify one or more attributes of the entities of the first set and a summarization technique for each of the selected one or more attributes; and
   in response to input received via the interface, summarize values of the one or more attributes according to the summarization technique, and including the summarized values in the dynamically updated summary.

23. The computer readable medium as recited in claim 19, wherein the instructions are further computer-executable to:
   obtain information relating the particular entity to entities represented in the first sub-network from one or more databases, and
   regenerate the mind map upon a detection of a change in the information.

* * * * *